United States Patent
Taniguchi

(10) Patent No.: US 8,175,788 B2
(45) Date of Patent: May 8, 2012

(54) CONTROL UNIT OF DIESEL ENGINE

(75) Inventor: Satoshi Taniguchi, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 305 days.

(21) Appl. No.: 12/671,151

(22) PCT Filed: Aug. 6, 2008

(86) PCT No.: PCT/JP2008/064147
§ 371 (c)(1),
(2), (4) Date: Jan. 28, 2010

(87) PCT Pub. No.: WO2009/020163
PCT Pub. Date: Feb. 12, 2009

(65) Prior Publication Data
US 2010/0204905 A1    Aug. 12, 2010

(30) Foreign Application Priority Data
Aug. 8, 2007  (JP) .................................. 2007-207176

(51) Int. Cl.
*F01N 3/10*     (2006.01)
*F02D 43/00*    (2006.01)
*F02M 25/07*    (2006.01)

(52) U.S. Cl. ....................................................... 701/103

(58) Field of Classification Search .......... 701/103–105, 701/108, 109, 102, 115; 60/276, 285, 286, 60/300, 310, 303
See application file for complete search history.

(56) References Cited

U.S. PATENT DOCUMENTS

| | | | |
|---|---|---|---|
| 7,331,170 B2 * | 2/2008 | Shimoda | 60/286 |
| 8,086,389 B2 * | 12/2011 | Noda | 701/103 |

FOREIGN PATENT DOCUMENTS

| | | |
|---|---|---|
| JP | A-05-106498 | 4/1993 |
| JP | A-06-146866 | 5/1994 |
| JP | A-2006-177311 | 7/2006 |
| JP | A-2006-177313 | 7/2006 |
| JP | A-2007-239531 | 9/2007 |
| JP | 2009127486 A * | 6/2009 |
| JP | 2009133279 A * | 6/2009 |
| JP | 2010242664 A * | 10/2010 |

OTHER PUBLICATIONS

International Search Report issued in International Application No. PCT/JP2008/064147 on Nov. 18, 2008 (with English-language translation).

* cited by examiner

*Primary Examiner* — Hieu T Vo
(74) *Attorney, Agent, or Firm* — Oliff & Berridge, PLC

(57) ABSTRACT

A diesel engine is provided with an exhaust fuel addition valve capable of adding fuel from an exhaust passage on an upstream side of an exhaust post-treatment device. An ECU, which is a control unit of the diesel engine, has a function to estimate biofuel concentration in the fuel and a function to obtain an exhaust temperature in the exhaust passage. The ECU sets a minimum operating exhaust temperature, which is a lower limit value of the exhaust temperature to permit operation of the exhaust fuel addition valve, according to the estimated biofuel concentration. The fuel added from the exhaust fuel addition valve is sufficiently vaporized in exhaust gas having temperature not lower than a minimum operation permission exhaust temperature set according to the biofuel concentration and is allowed to flow to the exhaust post-treatment device.

12 Claims, 4 Drawing Sheets

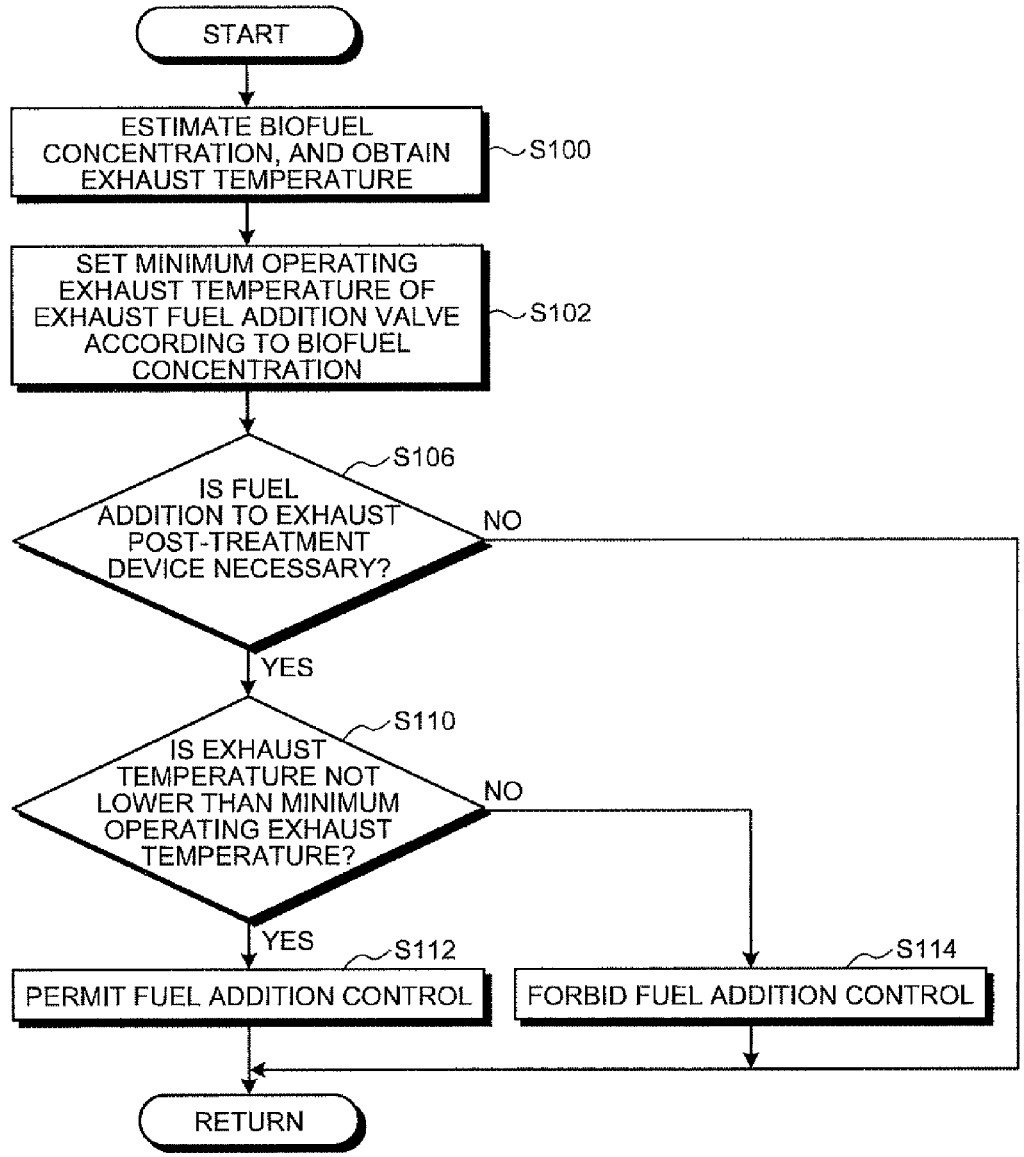

CONTROL UNIT OF DIESEL ENGINE

TECHNICAL FIELD

The present invention relates to a control technique of a diesel internal-combustion engine, and particularly relates to the control of the diesel engine provided with an exhaust fuel addition valve capable of adding fuel from an exhaust passage on an upstream side of an exhaust post-treatment device.

BACKGROUND ART

The exhaust post-treatment device for treating a harmful component and a particulate matter in exhaust gas discharged from a cylinder is generally provided on the diesel internal-combustion engine (hereinafter, simply referred to as a "diesel engine"). The exhaust post-treatment device includes an exhaust purification catalyst for purifying the harmful component in the exhaust gas by catalyst reaction, a particulate filter mechanism (hereinafter, simply referred to as a "filter mechanism") for collecting the particulate matter (hereinafter, referred to as PM) in the exhaust gas, and the like.

The exhaust purification catalyst includes, for example, a NOx occlusion-reduction catalyst for occluding nitrogen oxide (NOx) in the exhaust gas to reduce it to nitrogen. By supplying hydrocarbon as a reduction agent to the NOx occlusion-reduction catalyst, the occluded nitrogen oxide reacts with hydrocarbon and is reduced to nitrogen. On the other hand, the filter mechanism includes a diesel particulate filter (DPF) or the like for regenerating a filter by collecting the PM and burning the collected PM to discharge it as carbon dioxide. A method of burning the collected PM includes a method of heating the filter with an electric heater and a method of increasing the temperature of the exhaust gas flowing through the filter, and the method of increasing the temperature of the exhaust gas includes a method of increasing the temperature by adding hydrocarbon, which is the fuel, to the exhaust gas containing a large amount of oxygen.

In this manner, in the diesel engine provided with the exhaust purification catalyst as the exhaust post-treatment device, there is a case in which the fuel is added into the exhaust gas flowing toward the exhaust purification catalyst for supplying hydrocarbon as the reduction agent, such as a so-called rich spike. On the other hand, in the diesel engine provided with the filter mechanism as the exhaust post-treatment device, there is a case in which the fuel is added into the exhaust gas flowing toward the filter mechanism in order to regenerate the filter by increasing the temperature of the exhaust gas.

In order to add the fuel into the exhaust gas flowing toward the exhaust post-treatment device in this manner, the diesel engine in which an "exhaust fuel addition valve" for adding the fuel is provided on the upstream side of the exhaust post-treatment device in the exhaust passage aside from a fuel injection device for supplying the fuel into the cylinder is known (refer to the patent document 1, for example).

Recently, in the diesel engine, there is a case in which biological diesel fuel (hereinafter, referred to as biofuel) synthesized from vegetable oil such as canola oil and palm oil is used. The biofuel contains a larger amount of high-boiling point components than in a case of light oil, and is characterized in that this hardly vaporizes (less volatile) and the like.

There is a case in which such biofuel is mixed with the light oil at predetermined concentration and is used in the diesel engine. Therefore, in the control technique of the diesel engine in the patent document 1, the concentration of the biofuel contained in the mixed fuel is detected from an output of an air-oil ratio sensor provided on a downstream side of the exhaust post-treatment device (NOx occlusion-reduction catalyst/particulate filter), and a fuel additive amount at an early stage of the fuel addition is increased and the fuel additive amount at a latter stage of the fuel addition is decreased as compared to a case in which a predetermined light oil (reference fuel) is used, as the detected concentration of the biofuel becomes higher. Also, it is controlled such that difference between the fuel additive amount at the early stage of the fuel addition and that at the latter stage of the fuel addition is larger as compared to a case in which the predetermined light oil is used, as the exhaust temperature becomes lower.

Thereby, even when the mixed fuel having volatile (vaporizability) different from that of the predetermined light oil (reference fuel), behavior of the air-oil ratio in the vicinity of the exhaust post-treatment device (NOx occlusion-reduction catalyst/particulate filter) is made closer to the behavior in a case in which the predetermined light oil is added.

Patent Document 1: Japanese Patent Application Laid-open No. 2006-177313

DISCLOSURE OF INVENTION

Problem to be Solved by the Invention

However, the fuel additive amount at the early stage of the fuel addition is increased as the concentration of the biofuel becomes higher in the control technique disclosed in the patent document 1, so that when the concentration of the biofuel is higher, the fuel added to the exhaust passage reaches the exhaust post-treatment device without being sufficiently vaporized and atomized, and there is a concern that generation of unburned hydrocarbon and the particulate matter such as soot increases due to the fuel addition from the exhaust fuel addition valve. Also, when the exhaust temperature is low, the fuel additive amount at the early stage of the fuel addition is further increased, so that there is a concern that the discharge amount of the unburned hydrocarbon and the particulate matter further increases.

In addition, as to the diesel engine provided with the exhaust fuel addition valve, there is a technique to forbid the addition of the fuel by the exhaust fuel addition valve on the assumption that the added fuel does not sufficiently vaporize when the exhaust temperature is not higher than a predetermined value.

However, the related technique is based on the premise that only the light oil is used as the fuel, and a case of using the mixed fuel having volatile that changes according to the concentration of the biofuel is not considered. When the addition of the fuel to the exhaust passage is uniformly forbidden when the exhaust temperature is not higher than a predetermined value, also in a case in which the mixed fuel containing the biofuel as the fuel is used, there is a concern that the discharge of the unburned hydrocarbon and the particulate matter such as soot increases as compared to a case in which only the light oil is used as the fuel in a case in which the concentration of the biofuel is high.

The present invention is made in view of the above-described problems and an object thereof is to provide the control technique of the diesel engine capable of preventing the discharge amount of the unburned hydrocarbon and the particulate matter such as soot from increasing as compared to a case in which only the light oil is used as the fuel, due to the added fuel from the exhaust fuel addition valve, by controlling the exhaust fuel addition valve according to the concentration of the biofuel and the exhaust temperature.

Means for Solving Problem

A control unit of a diesel engine, according to the present invention, that is used in the diesel engine provided with an exhaust fuel addition valve capable of adding fuel from an exhaust passage on an upstream side of an exhaust post-treatment device and is capable of controlling the exhaust fuel addition valve, the control unit includes a biofuel concentration estimating unit that estimates biofuel concentration in the fuel; an exhaust temperature obtaining unit that obtains an exhaust temperature in the exhaust passage; and a minimum operating exhaust temperature setting unit that sets a minimum operating exhaust temperature being a lower limit value of the exhaust temperature to permit fuel addition from the exhaust fuel addition valve, wherein the minimum operating exhaust temperature setting unit sets the minimum operating exhaust temperature according to the estimated biofuel concentration.

In the control unit of the diesel engine, the minimum operating exhaust temperature setting unit can set the minimum operating exhaust temperature so as to be higher than in a case in which the biofuel concentration is zero, when the estimated biofuel concentration is not lower than a predetermined value.

In the control unit of the diesel engine, the minimum operating exhaust temperature setting unit can set the minimum operating exhaust temperature so as to be higher as the biofuel concentration becomes higher, when the estimated biofuel concentration is not lower than a predetermined value.

In the control unit of the diesel engine, the diesel engine can be provided with a fuel injection device capable of injecting the fuel into a cylinder at a fuel pressure higher than the fuel pressure of the exhaust fuel addition valve, and the control unit can comprise an exhaust temperature increasing controlling unit that increases the exhaust temperature by allowing the fuel injection device to perform fuel injection at a timing delayed with respect to main injection, when the obtained exhaust temperature is lower than the minimum operating exhaust temperature set according to the biofuel concentration.

In the control unit of the diesel engine, the control unit can comprise a clog prevention necessity judging unit that judges whether it is necessary to prevent clog of an injection hole of the exhaust fuel addition valve; and a clog prevention controlling unit that prevents the clog of the injection hole by allowing the exhaust fuel addition valve to inject the fuel, when it is judged that prevention of the clog is necessary and an obtained exhaust temperature is not lower than the minimum operating exhaust temperature set according to the biofuel concentration.

In the control unit of the diesel engine, an exhaust temperature controlling unit can increase the exhaust temperature, when it is judged that the prevention of the clog is necessary and the obtained exhaust temperature is lower than the minimum operating exhaust temperature set according to the biofuel concentration.

Effect of the Invention

According to the present invention, a minimum operating exhaust temperature to permit the fuel addition by the exhaust fuel addition valve is set according to the concentration of the biofuel in the fuel, so that it is possible to sufficiently vaporize the fuel added from the exhaust fuel addition valve in the exhaust gas having temperature not lower than the minimum operation permission exhaust temperature set according to the biofuel concentration and allow the fuel to flow to the exhaust post-treatment device, irrespective of the biofuel concentration in the fuel. It is possible to supply the sufficiently vaporized fuel to the exhaust purification catalyst as the reduction agent and to use the fuel to increase the exhaust temperature in the filter mechanism, thereby preventing the discharge amount of the unburned hydrocarbon and the particulate matter such as soot from increasing as compared to a case in which only the light oil is used as the fuel, due to the added fuel from the exhaust fuel addition valve.

BRIEF DESCRIPTION OF DRAWINGS

FIG. 3 is a flowchart of fuel addition availability judgment control executed by a control unit (ECU) of the diesel engine according to the first embodiment.

FIG. 4 is a view showing relationship between biofuel concentration and a minimum operating exhaust temperature set in the control unit (ECU) of the diesel engine according to the first embodiment.

Figure 1:
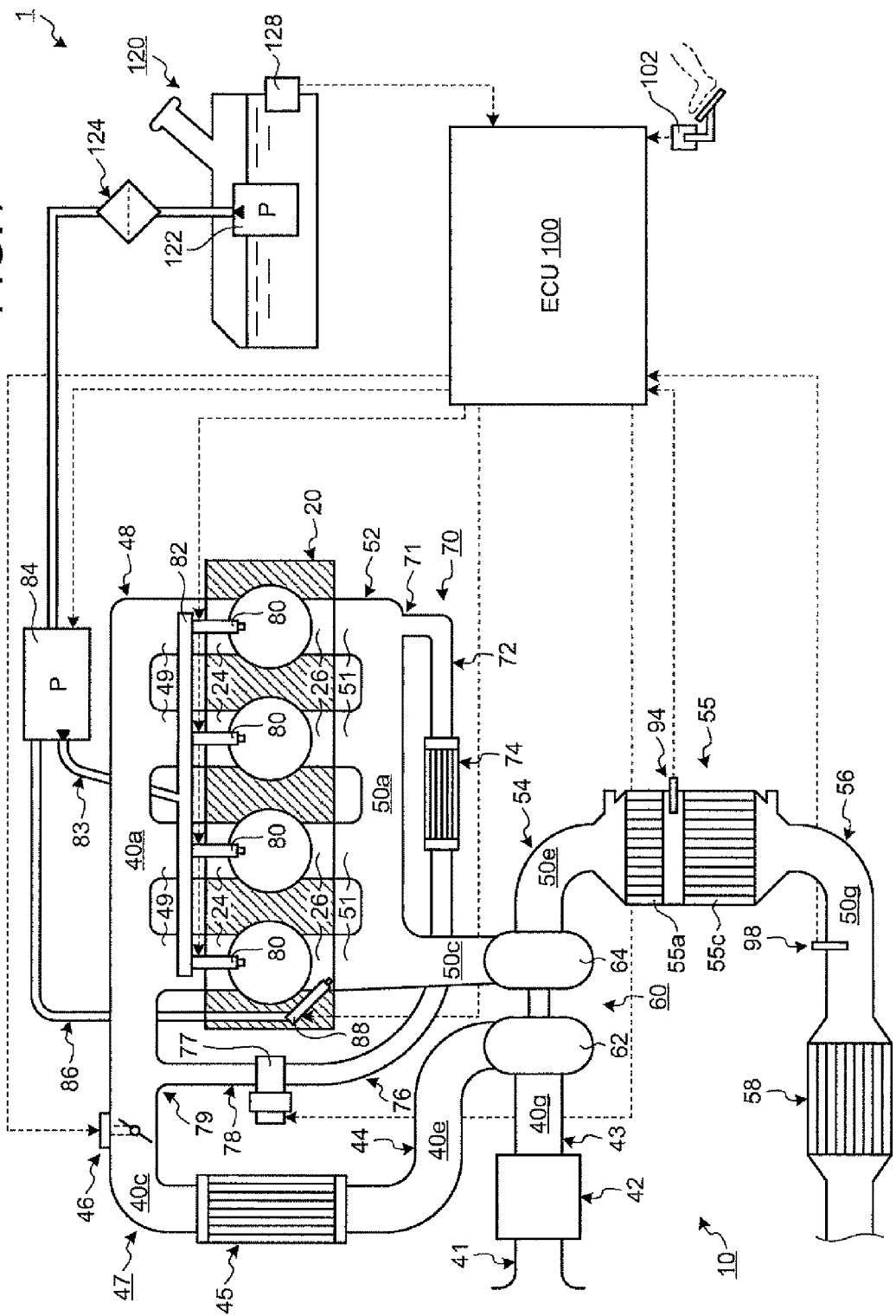
FIG. 1 is a schematic diagram showing a schematic configuration of a vehicle system including a diesel engine according to a first embodiment.

EXPLANATIONS OF LETTERS OR NUMERALS 1 vehicle system
10 diesel engine
24 intake port (intake passage)
26 exhaust port (exhaust passage)
42 air cleaner
46 throttle valve
48 intake manifold
50a manifold passage (exhaust passage)
50c converging portion (exhaust passage)
50e passage (exhaust passage)
52 exhaust manifold
55 exhaust post-treatment device
55a NOx occlusion-reduction catalyst (exhaust post-treatment device)
55c DPNR catalyst system (exhaust post-treatment device)
60 turbo supercharger
80 fuel injection device (fuel injection valve)
82 fuel rail
84 high-pressure fuel pump
88 exhaust fuel addition valve
94 exhaust temperature sensor
98 A/F sensor
100 electronic control unit (ECU) for diesel engine
102 accelerator pedal position sensor
120 fuel tank
122 low-pressure fuel pump
128 biofuel concentration detection device

BEST MODE(S) FOR CARRYING OUT THE INVENTION

Hereinafter, the present invention is described in detail with reference to drawings. Meanwhile, the present invention is not limited by this embodiment. Also, the following embodiment includes components easily conceivable by one skilled in the art or substantially identical components.

First Embodiment

First, a schematic configuration of a diesel engine and a vehicle system according to this embodiment is described with reference to FIG. 1. FIG. 1 is a schematic diagram showing a schematic configuration of the vehicle system including the diesel engine. Meanwhile, in FIG. 1, only a substantial part relating to the present invention is schematically shown as for the diesel engine and the vehicle system.

The diesel engine according to this embodiment is a compression self-igniting internal-combustion engine for self-igniting fuel by supplying the fuel in an atmosphere in a combustion chamber having high temperature due to compression. The diesel engine is mounted on an automobile as a prime mover, and an electronic control unit (hereinafter, referred to as an ECU) is provided on the automobile as controlling means for controlling a vehicle system including the diesel engine. Hereinafter, one cylinder of a plurality of cylinders of the diesel engine is described.

As shown in FIG. 1, a diesel engine 10 is a so-called direct injection diesel engine 10 in which a fuel injection device 80 provided for each cylinder directly injects the fuel into the cylinder. A turbo supercharger 60 for compressing inhaled air by kinetic energy of exhaust gas discharged from the cylinder, and a so-called exhaust gas recirculation device 70 (hereinafter, referred to as an EGR device) for taking in a part of the exhaust gas discharged from the cylinder from an exhaust passage and allowing the gas to flow into an intake passage are provided on the diesel engine 10. In order to control the diesel engine 10 thus configured, an ECU 100 for the diesel engine 10 is provided on a vehicle system 1.

A cylinder block not shown, a piston, a connecting rod, a crankshaft, and a cylinder head 20 are provided on the diesel engine 10 as components of an engine-body system in which the cylinders are formed. A cylinder bore is formed in the cylinder block, and the piston reciprocates in the cylinder bore with a piston ring (not shown) in sliding contact with an inner wall surface of the cylinder bore (hereinafter, referred to as a cylinder wall).

The cylinder head 20 is coupled to the cylinder block so as to be opposed to a top surface of the piston to block the cylinder bore. A space enclosed by the cylinder bore, the piston, and the cylinder head 20 is the "cylinder". Meanwhile, a cylinder arrangement of the diesel engine 10 according to this embodiment is an in-line four-cylinder arrangement.

When the crankshaft rotates, the piston reciprocates, and the air is inhaled into the cylinder. Further, the fuel is supplied to the cylinder by the fuel injection device 80. The supplied fuel is exposed to the high-temperature atmosphere in the cylinder and ignites. Reciprocating motion of the piston generated by ignition and combustion of the fuel is converted to rotational motion via the connecting rod and is output from the crankshaft. A crank angle sensor for detecting a rotation angle position of the crankshaft (hereinafter, referred to as a crank angle) is provided in the vicinity of the crankshaft to transmit a signal regarding the detected crank angle to the ECU 100.

On the cylinder head 20, an intake port 24 for guiding the inhaled air from the intake passage to be described later to the cylinder is formed on one side thereof, and an exhaust port 26 for discharging the exhaust gas from the cylinder to the exhaust passage to be described later is formed on the other side thereof, across a shaft center of the cylinder bore.

An intake valve and an exhaust valve not shown are provided on the cylinder head 20 so as to correspond to openings on the cylinder side of the intake port 24 and the exhaust port 26. The intake valve and the exhaust valve are driven by mechanical power from a camshaft not shown. The intake valve and the exhaust valve are configured so as to be opened and closed at a predetermined timing according to the crank angle.

When the intake valve opens, the intake port 24 communicates with an inside of the cylinder, and the diesel engine 10 can inhale the air in the intake passage to be described later from the intake port 24 into the cylinder. Also, when the exhaust valve opens, the exhaust port 26 communicates with the inside of the cylinder, and the diesel engine 10 can discharge the exhaust gas in the cylinder from the exhaust port 26 to the exhaust passage to be described later.

Also, an outside air duct 41 for introducing the air from outside air, an air cleaner 42 for removing refuse from the inhaled air (hereinafter, referred to as inhaled air), an air flowmeter (not shown) for measuring a flow rate of the inhaled air, an inter cooler 45 for cooling the air compressed by the turbo supercharger 60, a throttle valve 46 for adjusting the flow rate of the inhaled air, and an intake manifold 48, which is a distribution pipe for distributing the inhaled air to each cylinder are provided on the diesel engine 10, as components of an intake system for guiding the air from the outside air to the cylinder. Meanwhile, in the following description, an upstream side in a flow direction of the inhaled air is simply referred to as an "upstream side" and a downstream side in the flow direction is simply referred to as a "downstream side".

The downstream side of the intake manifold 48 is connected to the cylinder head 20, and a branch passage 49 communicates with the intake port 24. On the upstream side of the branch passage 49, a surge chamber 40a, which communicates with the same, is formed.

On the other hand, the throttle valve 46 is provided on the upstream side of the surge chamber 40a in the intake manifold 48. The throttle valve 46 adjusts a flow amount of the inhaled air inhaled into the cylinder (hereinafter, referred to as the inhaled air amount). Opening of the throttle valve 46 is controlled by the ECU 100.

Also, an intake piping 47 is connected to the upstream side of the throttle valve 46. A passage 40c formed in the intake piping 47 communicates with the surge chamber 40a in the intake manifold 48. The inter cooler 45 is connected to the upstream side of the intake piping 47. The inter cooler 45 is configured as a heat exchanger, and cools the inhaled air having high temperature due to the compression by a compressor 62 of the turbo supercharger 60 to be described later.

An intake piping 44 is connected to the upstream side of the intercooler 45. A passage 40e formed in the intake piping 44 communicates with the passage 40c in the intake piping 47 through a passage (not shown) in the inter cooler 45. The compressor 62 of the turbo supercharger 60 is connected to the upstream side of the intake piping 44. The passage 40e in the intake piping 44 communicates with an inside of the compressor 62 of the turbo supercharger 60.

An intake piping 43 is connected to the upstream side of the compressor 62 of the turbo supercharger 60. A passage 40g formed in the intake piping 43 communicates with the inside of the compressor 62 of the turbo supercharger 60. The air cleaner 42 is connected to the upstream side of the intake piping 43, and the outside air duct 41 is provide on the upstream side of the air cleaner 42. The passage 40g in the intake piping 43 communicates with an inside of the outside air duct 41 through the air cleaner 42.

The air flowmeter not shown is provided on the downstream side of an element in the air cleaner 42. The air flowmeter detects the inhaled air amount introduced from the outside air duct 41. The air flowmeter transmits a signal regarding the detected inhaled air amount to the ECU 100.

New-charged air introduced from the outside air duct 41 passes through the air cleaner 42, a flow amount thereof is detected by the air flowmeter, and the air is compressed by the compressor 62 of the turbo supercharger 60. The inhaled air (new-charged air) having high temperature due to the compression is cooled by the inter cooler 45 and flows to the throttle valve 46. The inhaled air in a flow amount adjusted by the throttle valve 46 flows into the surge chamber 40$a$ in the intake manifold 48, distributed from the branch passages 49 to each cylinder, and flows into the cylinder through the intake port 24.

Meanwhile, the "intake passage" means a flow passage formed of the above-described intake system components and the intake pipings and through which the inhaled air introduced from the outside air duct 41 passes before flowing into the cylinder. In this embodiment, the intake passage includes not only the surge chamber 40$a$ in the intake manifold 48 but also the intake port 24 of the cylinder head 20.

Also, an exhaust manifold 52 for allowing the exhaust gas from each cylinder to converge and introducing the same into the turbo supercharger 60, an exhaust post-treatment device 55 for treating nitrogen oxide and a particulate matter (PM) in the exhaust gas, an oxidation catalyst 58 for purifying the exhaust gas from the exhaust post-treatment device 55 by oxidizing reaction, and an A/F sensor 98 for detecting oxygen concentration of the exhaust gas between the oxidation catalyst 58 and the exhaust post-treatment device 55 are provided on the diesel engine 10 as components of an exhaust system for discharging the exhaust gas from the cylinder to the outside air. Meanwhile, in the following description, the upstream side in the flow direction of the exhaust gas is simply referred to as the "upstream side", and the downstream side in the flow direction thereof is simply referred to as the "downstream side".

A manifold passage 50$a$ is formed in the exhaust manifold 52, and branch portions 51 are provided on the upstream side of the manifold passage 50$a$ so as to correspond to each cylinder. The branch portions 51 formed in the exhaust manifold 52 communicate with the exhaust port 26 of each cylinder, respectively. Also, a converging portion 50$c$ at which the exhaust gas from each cylinder converges is provided on the downstream side of the manifold passage 50$a$. The manifold passage 50$a$ formed in the exhaust manifold 52 allows the exhaust gas discharged from a plurality of cylinders of the diesel engine 10 through the intake ports 26 to converge at the converging portion 50$c$ and introduces the gas to a turbine 64 of the turbo supercharger 60 to be described later.

The turbo supercharger 60 has the compressor 62 interposed between the intake pipings 43 and 44, and the turbine 64 interposed between the exhaust manifold 52 and the exhaust pipe 54. A compressor wheel (not shown), which rotates to compress the air, is accommodated in a housing of the compressor 62, and a turbine wheel (not shown), which is rotate-driven by a flow of the exhaust gas, is accommodated in a housing of the turbine 64. The compressor wheel and the turbine wheel are integrally coupled to each other.

In the turbo supercharger 60, the turbine wheel and the compressor wheel are rotate-driven by the kinetic energy of the exhaust gas flow flowing from the converging portion 50$c$ of the manifold passage 50$a$ to the turbine 64, thereby compressing the air in the compressor 62 to feed to the inter cooler 45. The exhaust gas in the turbine 64 flows through the passage 50$e$ in the exhaust piping 54 to the downstream side and flows into the exhaust post-treatment device 55 to be described later.

A NOx occlusion-reduction catalyst 55$a$, which is an exhaust purification catalyst for occluding the nitrogen oxide in the exhaust gas to reduce the nitrogen oxide to nitrogen, is provided on a precedent stage (upstream side) of the exhaust post-treatment device 55. On the other hand, a DPNR catalyst system 55$c$, which is the exhaust purification catalyst with a filter mechanism, for simultaneously purifying the PM and the nitrogen oxide is provided on a subsequent stage (downstream side) thereof.

The NOx occlusion-reduction catalyst 55$a$ occludes the nitrogen oxide in the exhaust gas as nitrate, when the exhaust gas flowing therethrough is in a hyperoxic atmosphere containing a large amount of oxygen (lean atmosphere). On the other hand, when the exhaust gas flowing through the NOx occlusion-reduction device 55$a$ is in a reduction atmosphere containing a large amount of unburned hydrocarbon (hereinafter, simply referred to as "HC") (rich atmosphere), the NOx occlusion-reduction catalyst 55$a$ reduces the occluded nitrogen oxide to nitrogen by the HC as a reduction agent contained in the exhaust gas. In this manner, the NOx occlusion-reduction catalyst 55$a$ is capable of purifying the nitrogen oxide in the exhaust gas. Meanwhile, a method of forming the reduction atmosphere in the exhaust passage is described later.

On the other hand, the DPNR catalyst system 55$c$ has both a function of a diesel particulate filter (hereinafter, referred to as a DPF) for regenerating the filter by collecting the PM and burning the collected PM to discharge as carbon dioxide and a function of the above-described NOx occlusion-reduction catalyst, and is capable of simultaneously purifying the PM and the nitrogen oxide.

In detail, the DPNR catalyst system 55$c$ collects the PM in the exhaust gas flowing therethrough by the filter, and when the exhaust gas is in the hyperoxic atmosphere, the DPNR catalyst system 55$c$ transforms the nitrogen oxide into the nitrate to occlude it, and oxidizes the collected PM by active oxygen generated at that time and oxygen in the exhaust gas. On the other hand, when the exhaust gas flowing through the DPNR catalyst system 55$c$ is in the reduction atmosphere (rich atmosphere), the DPNR catalyst system 55$c$ reduces the occluded nitrogen oxide to nitrogen by the HC as the reduction agent contained in the exhaust gas and oxidizes the PM by the active oxygen generated at that time. In this manner, the DPNR catalyst system 55$c$ is capable of continuously oxidizing and burning the PM to regenerate the filter that has collected the PM.

Also, an exhaust temperature sensor 94 for detecting a temperature (hereinafter, referred to as an exhaust temperature) of the exhaust gas flowing through the exhaust passage is provided between the NOx occlusion-reduction catalyst 55$a$ and the DPNR catalyst system 55$c$. The exhaust temperature sensor 94 detects the exhaust temperature between the NOx occlusion-reduction catalyst 55$a$ and the DPNR catalyst system 55$c$, that is to say, the temperature of the exhaust post-treatment device 55. The exhaust temperature sensor 94 transmits a signal regarding the detected exhaust temperature to the ECU 100.

An exhaust pipe 56 is connected to the downstream side of the exhaust post-treatment device 55 described above, and a passage 50$g$ is formed on the exhaust pipe 56. The exhaust gas containing less nitrogen oxide and PM due to the exhaust post-treatment device 55 flows through the passage 50$g$. The A/F sensor 98 for detecting the oxygen concentration of the exhaust gas in the passage 50$g$ is mounted on the exhaust pipe

56. The A/F sensor 98 transmits a signal regarding the oxygen concentration in the exhaust gas flowing into the oxidation catalyst 58 containing less nitrogen oxide and PM due to the passage 50g, that is to say, the exhaust post-treatment device 55, to the ECU 100.

The oxidation catalyst 58 is provided on the downstream side of the exhaust pipe 56. The oxidation catalyst 58 oxidizes and purifies hydrocarbon and carbon monoxide contained in the exhaust gas, which has passed through the exhaust post-treatment device 55. The exhaust gas purified by the oxidation catalyst is discharged to the outside air.

Meanwhile, the "exhaust passage" is intended to mean the flow passage through which the exhaust gas discharged from the cylinder passes before flowing into the exhaust post-treatment device 55. In this embodiment, the exhaust passage includes the exhaust port 26 of the cylinder head 20, the flow passage in the turbine 64, the passage 50a formed in the exhaust pipe 54, and the passage in the exhaust post-treatment device 55 in addition to the manifold passage 50a (the branch portion 51 and the converging portion 50c) formed in the exhaust manifold 52.

In addition, a so-called exhaust gas recirculation device 70 (hereinafter, referred to as an EGR device) for taking in a part of the exhaust gas discharged from the cylinder from the exhaust passage and allows the gas to flow in the intake passage is provided on the diesel engine 10. The EGR device 70 has an EGR passage for allowing the exhaust passage and the intake passage to communicate with each other, an EGR valve 77 for adjusting a flow amount of the exhaust gas flowing through the EGR passage (hereinafter, referred to as EGR gas), and an EGR cooler 74 for cooling the EGR gas, and this is hereinafter described in detail.

An intake opening 71 of the EGR gas is provided on the above-described exhaust manifold 52, and an EGR piping 72 is connected to the intake opening 71. The EGR cooler 74 is connected to the EGR piping 72 on the downstream side thereof in the flow direction of the EGR gas (hereinafter, simply referred to as the "downstream side"). The EGR cooler 74 is composed of the heat exchanger and is capable of cooling the EGR gas, which has flowed in. An EGR piping 76 is connected to the downstream side of the EGR cooler 74.

An EGR valve 77 is provided on an end on the downstream side of the EGR piping 76. The EGR valve 77 is composed of an electromagnetic valve. An EGR piping 78 is connected to the downstream side of the EGR valve 77. The EGR piping 78 connects an outlet opening 79 of the EGR gas provided on the intake manifold 48 and the EGR valve 77. Opening of the EGR valve 77, that is to say, the flow amount of the EGR gas flowing through the EGR passage is controlled by the ECU 100.

Meanwhile, the "EGR passage" means the flow passage formed of the EGR pipings 72, 76 and 78, the EGR cooler 74, and the EGR valve 77, through which the exhaust gas, that is to say, inactive gas introduced from the intake opening 71 passes before reaching the outlet opening 79. In this embodiment, the EGR passage includes not only the passage in the EGR pipings 72, 76 and 78, but also the passage formed in the EGR cooler 74 and the EGR valve 77.

Also, the fuel injection device 80 provided for each cylinder for directly injecting the fuel into the cylinder, a fuel rail 82 for distributing the fuel to each fuel injection device 80, and a high-pressure fuel pump 84 for pressure-feeding the fuel to the fuel rail 82 are provided on the diesel engine 10 as components of a fuel supply system for supplying the fuel to the cylinder. The fuel pressure-fed from the high-pressure fuel pump 84 to the fuel rail 82 is distributed by the fuel rail 82 to be fed to each fuel injection device 80.

The high-pressure fuel pump 84 acts by the mechanical power from the camshaft (not shown) of the diesel engine 10, and inhales a fuel from the fuel tank 120 to increase the pressure thereof. The high-pressure fuel pump 84 supplies high-pressure fuel obtained by increasing the pressure thereof from the fuel piping 83 to the fuel rail 82. Operation of the high-pressure fuel pump 84 is controlled by the ECU 100.

The fuel rail 82 is configured to be able to accumulate the fuel therein at a predetermined fuel pressure. The fuel rail 82 distributes and supplies the fuel to each fuel injection device 80. High-pressure (180 MPa, for example) fuel is supplied from the high-pressure fuel pump 84 to the fuel rail 82.

The common fuel rail 82 supplies the fuel to each fuel injection device 80 at a predetermined fuel pressure. The fuel injection device 80 is composed of a piezo-driven fuel injection valve and is capable of performing, a so-called multi-stage injection in which fuel injection is performed multiple times in one cycle. An injection time period of the fuel injection device 80 in each cycle, that is to say, an injection timing and an injection time length (valve opening time) are controlled by the ECU 100 via a driver unit not shown.

Also, an exhaust fuel addition valve 88 for adding the fuel to the exhaust passage is provided on the diesel engine 10 aside from the fuel injection device 80 for supplying the fuel to the cylinder. The exhaust fuel addition valve 88 is composed of an electromagnetically driven fuel injection valve, and is supplied with the fuel at a predetermined fuel pressure (1 MPa, for example) from the high-pressure fuel pump 84 through the fuel piping 86.

The exhaust fuel addition valve 88 is provided in the vicinity of the exhaust port 26 of the cylinder providing the shortest exhaust passage from the exhaust port 26 to the turbine 64, out of a plurality of cylinders of the diesel engine 10. The exhaust fuel addition valve 88 is capable of adding the fuel to the exhaust passage by injecting the fuel from an injection hole exposed in the exhaust port 26 toward the converging portion 50c.

In this manner, the exhaust fuel addition valve 88 for injecting the fuel to the exhaust passage injects the fuel at the fuel pressure lower than that of the fuel injection device 80 for injecting the fuel into the cylinder. That is to say, since the injected fuel from the fuel injection device 80 is injected at the fuel pressure higher than that of the exhaust fuel addition valve 88, the injected fuel is more atomized than the fuel injected (added) from the exhaust fuel addition valve 88, and is injected into the cylinder having temperature higher than that of the exhaust passage, so that the injected fuel tends to easily vaporize.

The vehicle system 1 including the above-described diesel engine 10 is provided with a low-pressure fuel pump 122 in the fuel tank 120 for storing the fed fuel, for pressure-feeding the fuel toward the above-described high-pressure fuel pump 84. The fuel from the low-pressure fuel pump 122 is filtered by a fuel filter 124 to remove impurities and is supplied to the high-pressure fuel pump 84.

Also, an accelerator pedal position sensor 102 for detecting an operation amount of an accelerator pedal by a driver is provided on the vehicle system 1. The accelerator pedal position sensor 102 transmits a signal regarding the detected operation amount of the accelerator pedal (hereinafter, referred to as an accelerator operation amount) to the ECU 100.

In the vehicle system 1 thus configured, the ECU 100 receives the signal regarding the crank angle from the crank angle sensor, the signal regarding the inhaled air amount (new-charged air amount) from the air flowmeter, and the signal regarding the accelerator operation amount from the accelerator pedal position sensor 102. In addition, the ECU 100 detects the signal regarding the exhaust temperature in the vicinity of the exhaust post-treatment device 55 and the signal regarding the oxygen concentration in the exhaust gas after passing through the exhaust post-treatment device 55 (before flowing into the oxidation catalyst 58) from the exhaust temperature sensor 94 and the A/F sensor 98, respectively.

The ECU 100 calculates various control variables based on these signals. The control variables include the rotation angle position of the crankshaft (crank angle), a rotation speed of the crankshaft (hereinafter, referred to as an engine rotation speed), the mechanical power output from the crankshaft by the diesel engine 10 (hereinafter, referred to as mechanical load), the inhaled air amount, the accelerator operation amount, the exhaust temperature in the vicinity of the exhaust post-treatment device 55, and the oxygen concentration contained in the exhaust gas after passing through the exhaust post-treatment device 55 and before flowing into the oxidation catalyst 58.

The ECU 100 is capable of determining and controlling the fuel injection amount of the fuel injection device 80, the opening of the throttle valve 46, and the opening of the EGR valve 77, based on an operating state of the diesel engine 10 known from the control variables.

In the diesel engine 10, the ECU 100 is capable of allowing the fuel injection device 80 to perform the fuel injection performed in the vicinity of a compression top dead center with a main purpose of power production, for causing diffusion-combustion of the fuel in the cylinder (hereinafter, referred to as a main injection).

Also, the ECU 100 is capable of allowing the fuel injection device 80 to perform the fuel injection performed at a timing advanced with respect to the main injection (for example, before the compression top dead center 70° CA), with a main purpose of reducing the PM such as smoke and soot and combustion noise, for premixed-burning the fuel in the cylinder (hereinafter, referred to as a pilot injection).

Also, the ECU 100 is capable of allowing the fuel injection device 80 to perform the fuel injection performed at the timing delayed with respect to the main injection, in detail, at a timing after and in the vicinity of the main injection (0.7 msec after the end of the main injection, for example), with a main purpose of reducing the PM generated by the main injection, for activating the diffusion combustion (latter period) generated by the main injection (hereinafter, referred to as an after-injection).

In addition, the ECU 100 is capable of allowing the fuel injection device 80 to perform the fuel injection performed at a timing largely delayed with respect to the main injection (after the compression top dead center 130° CA, for example), with a main purpose of increasing the temperature of the exhaust gas and forming the reduction atmosphere in the exhaust purification catalyst, for increasing the HC contained in the exhaust gas from the cylinder (hereinafter, referred to as a post injection).

In addition, the ECU 100 is capable of controlling the exhaust fuel addition valve 88 to add the fuel to the exhaust passage. The ECU 100 instructs the exhaust fuel addition valve 88 to add the fuel to the exhaust passage at the injection timing and the injection time length set in advance according to accumulated operating time of the diesel engine 10 and an accumulated fuel injection amount of the fuel injection device 80.

It is possible to supply the reduction atmosphere (rich atmosphere) in the NOx occlusion-reduction catalyst 55a and the DPNR catalyst system 55c, which compose the exhaust post-treatment device 55, by adding the fuel to the exhaust passage by the exhaust fuel addition valve 88 controlled by the ECU 100. Thereby, it is possible to reduce the nitrogen oxide occluded in the NOx occlusion-reduction catalyst 55a and the DPNR catalyst system 55c to nitrogen. The fuel addition control of the exhaust fuel addition valve 88 executed by the ECU 100 for reducing the nitrogen oxide occluded in the exhaust post-treatment device 55 in this manner is referred to as "NOx reduction control" in the following description.

Also, by adding the fuel to the exhaust passage by the exhaust fuel addition valve 88, it is possible to increase the exhaust temperature of the exhaust gas flowing through the DPNR catalyst system 55c, thereby increasing the temperature of the filter mechanism composing the DPNR catalyst system 55c. Thereby, it is possible to recover PM collecting ability of the filter, that is to say, to regenerate the filter, by oxidizing the PM (soot or the like) collected with the filter and discharging the resultant as carbon dioxide. The fuel addition control of the exhaust fuel addition valve 88 executed by the ECU 100 for regenerating the filter having collected the PM in this manner is referred to as "PM collection filter regeneration control" in the following description.

Also, it is possible to increase the exhaust temperature of the exhaust gas flowing through the exhaust post-treatment device 55, thereby increasing the temperature of the NOx occlusion-reduction catalyst 55a and the DPNR catalyst system 55c, by adding the fuel to the exhaust passage by the exhaust fuel addition valve 88. Thereby, in the NOx occlusion-reduction catalyst 55a and the DPNR catalyst system 55c, even when NOx purifying ability is deteriorated by "sulfur poisoning" in which a sulfur component in the fuel is occluded as a sulfated compound, it is possible to recover the NOx purifying ability of the catalyst, that is to say, to regenerate the catalyst by increasing the temperature of the catalyst and supplying the reduction atmosphere, thereby oxidizing a sulfated compound on the catalyst to discharge the resultant as SOx. The fuel addition control of the exhaust fuel addition valve 88 executed by the ECU 100 for regenerating the sulfur poisoned catalyst in this manner is referred to as "sulfur poisoned catalyst regeneration control" in the following description.

There is a case in which not only diesel fuel obtained by fractional distillation of crude oil, which is a mineral resource, (hereinafter, referred to as light oil) but also the diesel fuel made of an organic resource, which is a biological material, (for example, vegetable oil) (hereinafter, referred to as biofuel) is mixed at predetermined concentration and fed to the fuel tank 120. Meanwhile, the "biofuel" is composed of vegetable oil ester (fatty acid methyl ester: FAME) or the like obtained by reacting and esterifying the vegetable oil such as canola oil and palm oil with methanol or the like.

The biofuel includes more high-boiling point components than the light oil does and is characterized in that it hardly vaporizes. Also, since kinetic viscosity of the biofuel is higher than that of the light oil, the fuel injected from the exhaust fuel addition valve 88 is hardly atomized. Also, since theoretical air-oil ratio of the biofuel is smaller than that of the light oil, when supplying a desired reduction atmosphere to the exhaust post-treatment device 55 such as when performing a rich spike, a volume flow of the fuel to be added from the exhaust fuel addition valve 88 to the exhaust passage is characteristically larger than that of the light oil. Further, since the biofuel contains oxygen (oxygenated compound) in a molecule composing the fuel unlike the light oil, the combustion of the fuel is characteristically accelerated by the oxygen.

Figure 2:
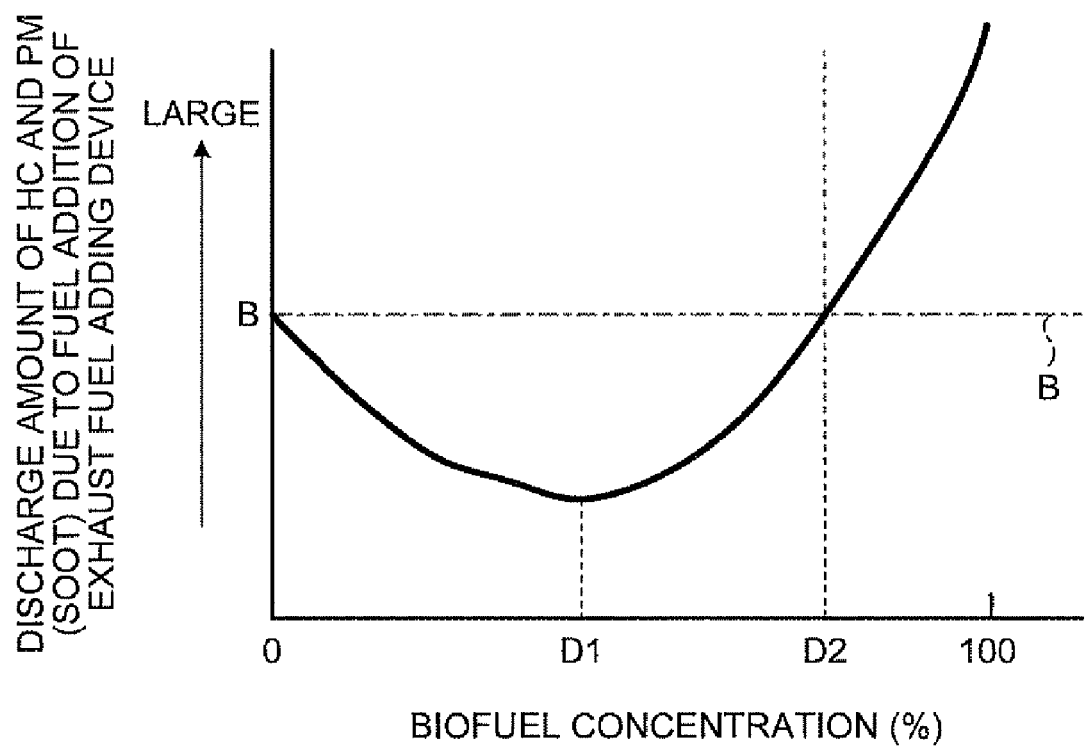
FIG. 2 is a schematic diagram for explaining a discharge amount of HC and PM (soot) due to fuel addition of an exhaust fuel addition valve.

Therefore, in the diesel engine 10 provided with the exhaust fuel addition valve 88 capable of adding the fuel from the upstream side of the exhaust post-treatment device 55 in the exhaust passage, when the fuel obtained by mixing predetermined light oil and the biofuel (mixed fuel) is used, a generation amount (discharge amount) of the HC and the PM (soot) due to the fuel addition by the exhaust fuel addition valve 88 changes according to concentration of the biofuel (hereinafter, referred to as biofuel concentration). Hereinafter, this is described with reference to FIG. 2. FIG. 2 is a schematic diagram for illustrating the discharge amount of the HC and the PM (soot) due to the fuel addition of the exhaust fuel addition valve.

Meanwhile, in this embodiment, the fuel obtained by mixing two kinds of fuel, which is the predetermined light oil and a specific kind of biofuel, at a certain mixing ratio is used as the fuel fed to the fuel tank 120 to be supplied to the diesel engine 10. This fuel includes so-called neat fuel having biofuel concentration of 100% and the predetermined light oil having biofuel concentration of zero.

In FIG. 2, the discharge amount of the HC and the PM in a case in which the biofuel concentration is zero, that is to say, in which only the predetermined light oil is used as the fuel is indicated by a dashed line B. In a range in which the biofuel concentration is from zero to concentration D1, the discharge amount of the HC and the PM due to the fuel addition decreases, as the biofuel concentration becomes higher. This is because, as the biofuel concentration becomes higher, the added fuel is hardly atomized and hardly vaporizes and the theoretical air-oil ratio becomes smaller, but the combustion (oxidation) of the fuel is accelerated due to the higher concentration of the oxygenated compound in the fuel; thereby, the discharge amount of the HC and the PM is apt to decrease.

Then, in a range in which the biofuel concentration is not lower than D1, an influence that the atomization and the vaporization of the fuel deteriorate and the theoretical gas-oil ratio becomes smaller is greater than a combustion acceleration effect due to the high concentration of the oxygenated compound, as the biofuel concentration becomes higher, the discharge amount of the HC and the PM tends to increase, and when the concentration becomes predetermined concentration D2, the discharge amount of the HC and the PM due to the fuel addition of the exhaust fuel addition valve 88 is the same as an exhaust amount B in a case in which only the predetermined light oil is used as the fuel.

In a range not lower than the concentration D2, the discharge amount of the HC and the PM is higher than the discharge amount B in a case in which the predetermined light oil is used as the fuel, and the discharge amount of HC and the PM tends to increase as the biofuel concentration becomes higher than the concentration D2.

In this manner, when the biofuel concentration in the fuel is not lower than the predetermined biofuel concentration D2, the influence that the atomization and the vaporization of the fuel deteriorate and the theoretical gas-oil ratio becomes smaller is greater than the effect that the combustion (oxidation) is accelerated by the oxygenated compound in the fuel, and there is a problem that the discharge amount of the HC and the PM due to the fuel addition of the exhaust fuel addition valve 88 increases than in a case in which only the predetermined light oil is used as the fuel.

Therefore, in the diesel engine 10 provided with the exhaust fuel addition valve 88 capable of adding the fuel from the upstream side of the exhaust post-treatment device 55 in the exhaust passage, when the fuel obtained by mixing the light oil and the biofuel (mixed fuel) is used, the discharge amount of the HC and the PM due to the fuel addition of the exhaust fuel addition valve 88 cannot be effectively suppressed by forbidding the addition of the fuel on the assumption that the fuel added to the exhaust passage does not sufficiently vaporize, when the exhaust temperature is not higher than a certain value, as in the case in which only the light oil is used as the fuel.

Then, the control unit (ECU) of the diesel engine 10 according to this embodiment is characterized in that a lower limit value of the exhaust temperature (hereinafter, referred to as a minimum operating exhaust temperature) to permit the fuel addition by the exhaust fuel addition valve 88 is set according to the concentration of the biofuel, and this is hereinafter described with reference to FIGS. 1, 3 and 4. FIG. 3 is a flowchart of fuel addition availability judgment control executed by the ECU. FIG. 4 is a view showing relationship between the biofuel concentration and the minimum operating exhaust temperature.

As shown in FIG. 1, a biofuel concentration detection device 128 for detecting the biofuel concentration in the fed fuel is provided on the fuel tank 120 for supplying the fuel to the diesel engine 10 according to this embodiment. The biofuel concentration detection device 128 is configured so as to be able to detect fuel condition such as viscosity and temperature of the fuel fed in the fuel tank 120. The biofuel concentration detection device 128 transmits a signal regarding the detected fuel condition to the ECU 100. The ECU 100 obtains the viscosity and the temperature of the fuel as the control variables upon reception of the signal regarding the fuel condition. The ECU 100 can estimate the biofuel concentration in the fuel based on the control variables such as the obtained viscosity and the temperature. That is to say, the ECU 100 has a function to estimate the biofuel concentration in the fuel supplied to the diesel engine 10 (biofuel concentration estimating means).

Meanwhile, the biofuel concentration estimating means is not limited to the above-described method. For example, the biofuel concentration detection device 128 may detect the viscosity and the temperature of the fuel fed to the fuel tank 120 and estimate the biofuel concentration to transmit the signal regarding the estimated biofuel concentration to the ECU 100. In this case, the ECU 100 receives the signal from the biofuel concentration detection device 128 and obtains the biofuel concentration as the control variable. Also, although the biofuel concentration detection device 128 is provided on the fuel tank 120 in this embodiment, it may also be provided on the fuel rail 82, the fuel pipings 83 and 86, and the high-pressure fuel pump 84.

Also, the biofuel concentration estimating means is not limited to the method to directly detect and estimate from the fuel by the biofuel concentration detection device 128 as described above. For example, in a predetermined operating state of the diesel engine 10, fuel supply system components such as the fuel injection device 80 are activated as in the case in which only the light oil is fed, then the oxygen concentration in the exhaust passage detected by the A/F sensor 98, that is to say, behavior of the air-fuel ratio in the exhaust passage (time history) is grasped by the ECU 100 and compared with the behavior of the air-fuel ratio in the case in which only the light oil is fed, thereby the biofuel concentration can be estimated.

In the vehicle system 1 thus configured, the ECU 100 executes the "fuel addition availability judgment control" to judge availability of the fuel addition from the exhaust fuel addition valve 88 to the exhaust passage in order to supply the reduction atmosphere (rich atmosphere) to the exhaust post-treatment device 55 of the diesel engine 10 or to increase the temperature of the exhaust post-treatment device 55. The fuel addition availability judgment control is repeatedly executed by the ECU 100 at the operating time of the diesel engine 10. In detail, the fuel addition availability judgment control is repeatedly executed when an ignition relay to supply power to various electric components of the diesel engine 10 is set ON.

First, at a step S100, the ECU 100 estimates the biofuel concentration by the above-described method and obtains the same as the control variable. In addition, the exhaust temperature in the exhaust post-treatment device 55 is obtained as the control variable.

Then, at a step S102, the ECU 100 sets the minimum operating exhaust temperature, which is the lower limit value of the exhaust temperature to permit the fuel addition by the exhaust fuel addition valve 88, according to the estimated biofuel concentration. Meanwhile, a map showing relationship between the biofuel concentration and the minimum operating exhaust temperature is obtained in advance by a matching examination or the like, and stored in the ROM (not shown) of the ECU 100 as a control constant.

The minimum operating exhaust temperature is set to the same temperature of 250° C., when the biofuel concentration is in a range from 0(%) to 70%, as shown in FIG. 4. When the biofuel concentration is higher than 70%, the minimum operating exhaust temperature is set to be higher than in a case in which the biofuel concentration is zero, and in detail the minimum operating exhaust temperature is set to be higher as the biofuel concentration becomes higher from 70%.

Then, at a step S106, the ECU 100 judges whether the fuel addition to the exhaust post-treatment device 55 is necessary. That is to say, the ECU 100 judges whether it is necessary to perform fuel addition control required by the exhaust post-treatment device 55. In detail, it is judged whether it is necessary to perform the fuel addition control of any of the NOx reduction control, the PM collection filter regeneration control, and the sulfur poisoned catalyst regeneration control. When it is judged that the fuel addition is not necessary (No), the procedure returns to the step S100.

On the other hand, at the step S106, when it is judged that the fuel addition is necessary (Yes), the ECU 100 judges whether the exhaust temperature in the exhaust post-treatment device 55 is not lower than the minimum operating exhaust temperature set according to the biofuel concentration (S110). That is to say, at the step S110, by adding the fuel from the exhaust fuel addition device 88 to the exhaust passage, it is judged whether the added fuel sufficiently vaporizes in the exhaust gas flowing through the exhaust passage. In other words, it is judged whether the discharge amount of the HC and the PM does not increase as compared to a case in which only the light oil is used as the fuel, by the fuel added to the exhaust passage.

At the step S110, when it is judged that the exhaust temperature is not lower than the minimum operating exhaust temperature (Yes), the ECU judges that the added fuel sufficiently vaporizes in the exhaust gas flowing through the exhaust passage and the discharge amount of the HC and the PM does not increase as compared to the case in which only the light oil is used as the fuel, and permits the fuel addition control by the exhaust fuel addition valve 88 (S112). The ECU 100 executes the fuel addition control (any of the NOx reduction control, the PM collection filter regeneration control, and the sulfur poisoned catalyst regeneration control) judged to be necessary at the step S106.

On the other hand, when it is judged that the exhaust temperature is lower than the minimum operating exhaust temperature (No), the ECU 100 judges that the added fuel cannot sufficiently vaporize in the exhaust gas flowing through the exhaust passage and the discharge amount of the HC and the PM increases as compared to the case in which only the light oil is used as the fuel, and forbids the fuel addition control by the exhaust fuel addition valve 88 (S114). Then, the procedure returns to the step S100.

By performing the fuel addition availability judgment control as described above, the diesel engine 10 sets the minimum operating exhaust temperature, which is the lower limit value to permit the operation of the exhaust fuel addition valve 88, according to the biofuel concentration in the fuel, and forbids the fuel addition by the exhaust fuel addition valve 88 when the exhaust temperature of the exhaust gas is lower than the set minimum operating exhaust temperature, so that it is possible to suppress the discharge amount of the PM such as soot and the HC from increasing as compared to the case in which only the light oil is used as the fuel, due to the fuel addition by the exhaust fuel addition valve 88.

As described above, in this embodiment, the ECU 100 has a function to set the minimum operating exhaust temperature, which is the lower limit value of the exhaust temperature to permit the operation of the exhaust fuel addition valve 88 (minimum operating exhaust temperature setting means), and the minimum operating exhaust temperature estimating means sets the minimum operating exhaust temperature to permit the fuel addition from the exhaust fuel addition valve 88 according to the estimated biofuel concentration.

Thereby, regardless of the biofuel concentration in the fuel, it is possible to sufficiently vaporize the fuel added from the exhaust fuel addition valve 88 in the exhaust gas having temperature not lower than a minimum operation permission exhaust temperature set according to the biofuel concentration and allow the fuel to flow to the exhaust post-treatment device 55. It is possible to supply the sufficiently vaporized fuel to the NOx occlusion-reduction catalyst 55a as the reduction agent or to use the fuel to increase the exhaust temperature in the filter mechanism of the DNR catalyst system 55c, so that it is possible to prevent the discharge amount of unburned hydrocarbon (HC) and the particulate matter (PM) such as soot from increasing as compared to the case in which only the light oil is used as the fuel, due to the fuel addition from the exhaust fuel addition valve 88.

Also, in this embodiment, the ECU 100 is configured to set the minimum operating exhaust temperature so as to be higher than in a case in which the biofuel concentration is zero when the estimated biofuel concentration is not lower than the predetermined value, and to set the minimum operating exhaust temperature so as to be higher as the biofuel concentration becomes higher, so that the influence that the atomization and the vaporization of the fuel deteriorates is greater than the combustion acceleration effect due to the biofuel concentration not lower than the predetermined value and the high concentration of the oxygenated compound, and it is possible to set the minimum operating exhaust temperature so as to correspond to a state in which the discharge amount of the PM such as soot and the HC increases when the fuel addition is performed from the exhaust fuel addition valve 88.

Second Embodiment

Figure 5:
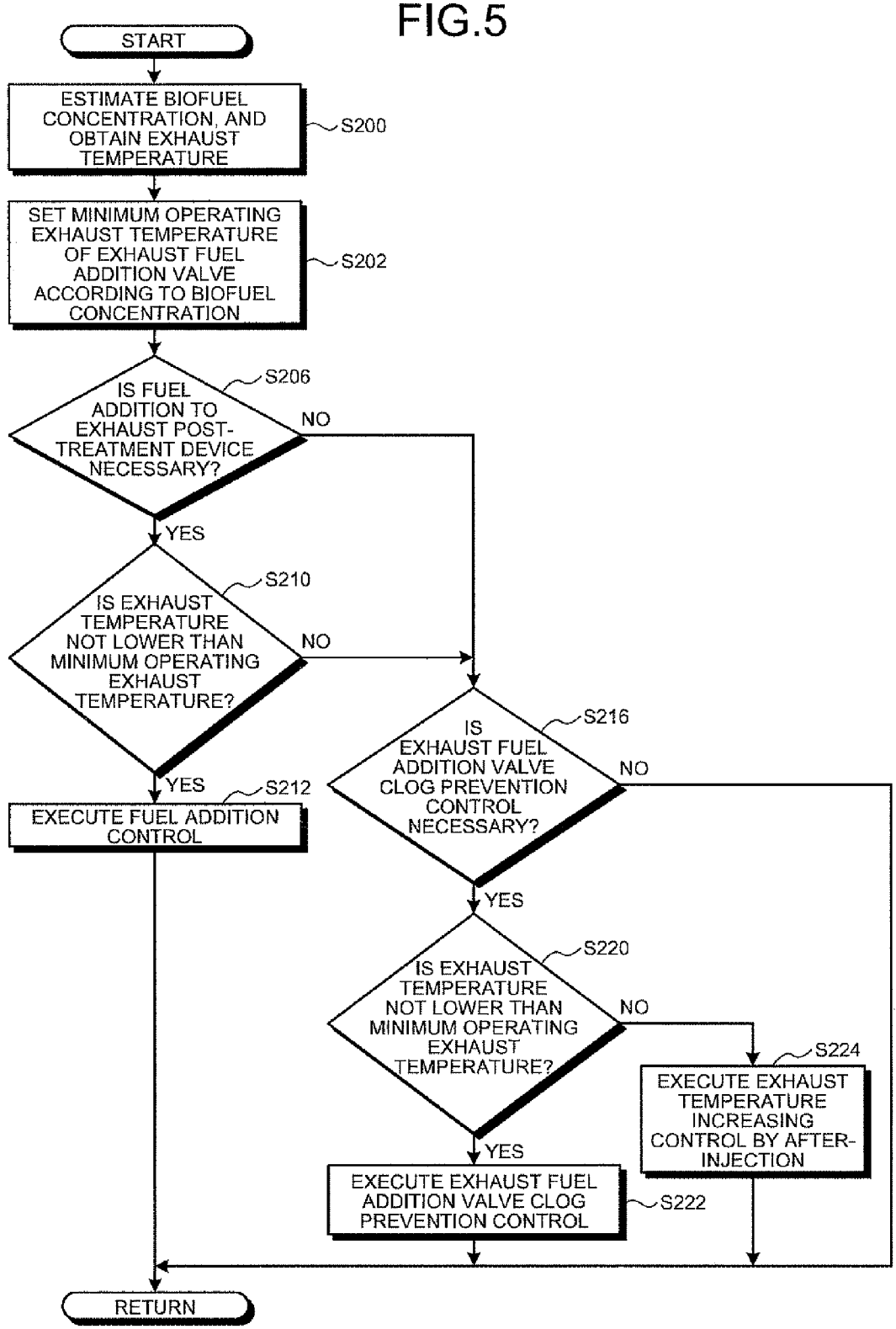
FIG. 5 is a flowchart of the fuel addition availability judgment control executed by a control unit (ECU) of the diesel engine according to a second embodiment.

The control unit (ECU) of the diesel engine according to this embodiment is described with reference to FIGS. 1, 4 and 5. FIG. 5 is a flowchart of the fuel addition availability judgment control executed by the ECU. In this embodiment, the ECU is different from that in the first embodiment in that the ECU allows the exhaust fuel addition valve to inject the fuel to prevent clog of the injection hole when it is judged that the clog of the injection hole of the exhaust fuel addition valve is required to be prevented and the obtained exhaust temperature is not lower than the minimum operating exhaust temperature set according to the biofuel concentration, and this is hereinafter described in detail. Meanwhile, the identical reference numeral is given to the configuration substantially identical to that of the first embodiment, and the description thereof is omitted.

As shown in FIG. 1, in the diesel engine 10, the injection hole of the exhaust fuel addition valve 88 is exposed in the exhaust passage, in detail, in the exhaust port 26 as described above, and is subjected to the high-temperature exhaust gas flow discharged from the cylinder. The exhaust gas is that before being treated by the DPNR catalyst system 55c of the exhaust post-treatment device 55, so that this contains relatively large amount of the PM such as the soot in the exhaust gas. Therefore, there is a concern that in the exhaust fuel addition valve 88 the injection hole thereof is clogged with the soot or the like, when the fuel injection is not performed for a predetermined period of time by the above-described fuel addition control.

Then, in this embodiment, even when it is judged that the fuel addition to the exhaust post-treatment device 55 is not necessary, if it is judged that the clog of the injection hole of the exhaust fuel addition valve 88 is required to be prevented, the ECU 100 performs the control to prevent the clog of the injection hole of the exhaust fuel addition valve 88 (hereinafter, referred to as clog prevention control) by allowing the exhaust fuel addition valve 88 to inject the fuel to the exhaust passage when the temperature of the exhaust gas flowing through the exhaust passage is not lower than the minimum operating exhaust temperature set according to the biofuel concentration.

The "clog prevention control" is the control in which the ECU 100 prevents the clog of the injection hole of the exhaust fuel addition valve 88 by allowing the exhaust fuel addition valve 88 to perform the fuel injection of a slight amount of fuel to solve the clog of the injection hole. The fuel amount injected by the exhaust fuel addition valve 88 to the exhaust passage when performing the clog prevention control is set so as to be smaller than the fuel amount to be added by the exhaust fuel addition valve 88 to the exhaust passage when performing the above-described fuel addition control (the NOx reduction control, the PM collection filter regeneration control, and the sulfur poisoned catalyst regeneration control).

Also, the ECU 100 can control the fuel injection device 80 to perform the after-injection, which is the fuel injection at the timing delayed with respect to the main injection, in detail, at the timing just after and in the vicinity of the main injection, thereby activating the diffusion combustion in the cylinder to increase the temperature of the exhaust gas discharged from the cylinder to the exhaust passage. Also, the ECU 100 can burn the injected fuel in the cylinder and the exhaust passage to increase the temperature of the exhaust gas by allowing the fuel injection device 80 to perform the post injection, which is the fuel injection at the timing largely delayed with respect to the main injection (for example, after the compression top dead center 130° CA).

In this manner, the ECU 100 is capable of performing the control (hereinafter, referred to as the exhaust temperature increasing control) to increase the exhaust temperature in the exhaust passage from the cylinder toward the exhaust post-treatment device 55 by allowing the fuel injection device 80 to perform the fuel injection (the after-injection and the post injection) at the timing delayed with respect to the main injection. By increasing the temperature (exhaust temperature) of the exhaust gas flowing through the exhaust passage, it becomes possible to sufficiently vaporize the fuel injected from the exhaust fuel addition valve 88 to the exhaust passage.

The fuel addition availability judgment control executed by the control unit 100 (ECU) of the diesel engine 10 according to this embodiment is described with reference to FIG. 5. Meanwhile, the fuel addition availability judgment control is repeatedly executed by the ECU 100 at the operating time of the diesel engine 10.

First, at a step S200, the ECU 100 estimates the biofuel concentration and obtains the same as the control variable. In addition, the ECU 100 obtains the exhaust temperature in the exhaust post-treatment device 55 as the control variable. Then, at a step S202, the ECU 100 sets the minimum operating exhaust temperature, which is the lower limit value of the exhaust temperature to permit fuel addition by the exhaust fuel addition valve 88, according to the obtained biofuel concentration.

Then, at a step S206, the ECU 100 judges whether the fuel addition to the exhaust post-treatment device 55 is necessary. That is to say, the ECU 100 judges whether it is necessary to perform any fuel addition control out of the NOx reduction control, the PM collection filter regeneration control, and the sulfur poisoned catalyst regeneration control.

At the step S206, when it is judged that the fuel addition to the exhaust post-treatment device 55 is necessary (Yes), the ECU 100 judges whether the exhaust temperature in the exhaust post-treatment device 55 is not lower than the minimum operating exhaust temperature set according to the biofuel concentration (S210).

At the step S210, when it is judged that the exhaust temperature is not lower than the minimum operating exhaust temperature (Yes), the ECU 100 judges that the added fuel sufficiently vaporizes in the exhaust gas flowing through the exhaust passage and the discharge amount of the HC and the PM does not increase as compared to the case in which only the light gas is used as the fuel, and permits the fuel addition control by the exhaust fuel addition valve 88 (S212).

On the other hand, when it is judged that the fuel addition to the exhaust post-treatment device 55 is not necessary (No) at the step S206, the procedure shifts to a step S216.

Also, even when the fuel addition to the exhaust post-treatment device 55 is judged to be necessary (Yes) at the step S206, if the exhaust temperature in the exhaust post-treatment device 55 is judged to be lower than the minimum operating exhaust temperature set according to the biofuel (No) at a next step S210, the procedure shifts to the step S216.

At the step S216, the ECU 100 judges whether the clog prevention control of the exhaust fuel addition valve 88 is necessary. Here, various methods may be used to judge whether the clog prevention control is necessary. For example, it is possible to judge by whether the accumulated time period during which the exhaust fuel addition valve 88 does not perform the fuel addition reaches a predetermined judgment value. In addition, it is also possible to judge by whether the accumulated fuel injection amount injected by the fuel injection device 80 during a time period in which the exhaust fuel addition valve 88 does not perform the fuel addition reaches a predetermined judgment value. The judgment values are obtained in advance by the matching examination or the like, and are stored in the ROM of the ECU 100 as the control constants. When it is judged that the clog prevention control is not required (No) at the step S216, the procedure returns to the step S200.

On the other hand, when it is judged that the clog prevention control is necessary (Yes) at the step S216, the ECU 100 judges whether the exhaust temperature in the exhaust post-treatment device 55 is not lower than the minimum operating exhaust temperature set according to the biofuel concentration (S220). That is to say, the clog prevention control is performed, and the fuel is injected from the exhaust fuel addition valve 88 to the exhaust passage, thereby it is judged whether the injected fuel sufficiently vaporizes in the exhaust gas flowing through the exhaust passage and the discharge amount of the HC and the PM does not increase.

When it is judged that the exhaust temperature is lower than the minimum operating exhaust temperature (No) at the step S220, the ECU 100 judges that the injected fuel cannot sufficiently vaporize in the exhaust gas at a current exhaust temperature and the discharge amount of the HC and the PM increases, and the ECU 100 executes the above-described exhaust temperature increasing control (S224).

The exhaust temperature increasing control increases the exhaust temperature of the exhaust gas by allowing the fuel injection device 80 to perform the after-injection at the timing delayed with respect to the main injection. Then, the procedure returns to the step S200. Thereby, the ECU 100 continues the exhaust temperature increasing control in each cycle of the diesel engine 10 until the temperature of exhaust gas flowing through the exhaust passage becomes not lower than the minimum operating exhaust temperature set according to the biofuel concentration.

Meanwhile, the exhaust temperature increasing control can also be realized by allowing the fuel injection device 80 to perform the post injection. By performing the exhaust temperature increasing control by the after-injection, it is possible to prevent the injected fuel from the fuel injection device 80 from adhering to a cylinder wall or from attenuating the oil of the cylinder wall as compared to a case in which the post injection is used.

On the other hand, when it is judged that the exhaust temperature is not lower than the minimum operating exhaust temperature (Yes) at the step S220, the ECU 100 judges that the added fuel sufficiently vaporizes in the exhaust passage and the discharge amount of the HC and the PM does not increase, and executes the clog prevention control of the exhaust fuel addition valve 88 (S222). After executing the clog prevention control, the procedure returns to the step S200.

By the execution of the above-described fuel addition availability judgment control by the ECU 100, even when the fuel addition to the exhaust post-treatment device 55 is not required, if it is necessary to prevent the clog of the injection hole of the exhaust fuel addition valve 88, the exhaust fuel addition valve 88 is allowed to inject the fuel when the exhaust temperature is not lower than the minimum operating exhaust temperature to prevent the clog of the injection hole. Since the clog of the injection hole is prevented, even when the fuel is injected from the exhaust fuel addition valve 88 to the exhaust passage, the exhaust temperature of the exhaust gas is not lower than the minimum operating exhaust temperature set according to the biofuel concentration, so that the injected fuel containing the biofuel from the exhaust fuel addition valve 88 can sufficiently vaporize in the exhaust gas, and it is possible to prevent the discharge amount of the HC and the PM from increasing as compared to the case in which only the light oil is used as the fuel.

As described above, in this embodiment, the ECU 100 has a function to judge whether it is necessary to prevent the clog of the injection hole of the exhaust fuel addition valve 88 (clog prevention necessity judging means), and has a function to prevent the clog of the injection hole (clog prevention controlling means) by allowing the exhaust fuel addition valve 88 to inject the fuel when it is judged that the prevention of the clog is necessary and the obtained exhaust temperature is not lower than the minimum operating exhaust temperature set according to the biofuel concentration.

Since the clog of the injection hole is prevented, even when the fuel is injected from the exhaust fuel addition valve 88 to the exhaust passage, the fuel can sufficiently vaporize in the exhaust gas having temperature not lower than the minimum operating exhaust temperature set according to the biofuel concentration, so that it is possible to prevent the discharge amount of the HC and the PM from increasing.

Also, in this embodiment, the diesel engine 10 is provided with the fuel injection device 80 capable of injecting the fuel into the cylinder at the fuel pressure higher than that of the exhaust fuel addition valve 88, and the ECU 100 has a function to increase the exhaust temperature (exhaust temperature increasing controlling means) by allowing the fuel injection device 80 to perform the fuel injection at the timing delayed with respect to the main injection, when it is judged that the prevention of the clog of the injection hole of the exhaust fuel addition valve 88 is necessary and the obtained exhaust temperature is lower than the minimum operating exhaust temperature set according to the biofuel concentration.

Even when the temperature of the exhaust gas flowing through the exhaust passage is lower than the minimum exhaust temperature, and the fuel from the exhaust fuel addition valve 88 does not sufficiently vaporize in the exhaust gas when the clog prevention control is performed, it is possible to increase the temperature of the exhaust gas flowing through the exhaust passage to not lower than the minimum operating exhaust temperature set according to the biofuel concentration by allowing the fuel injection device 80 to perform the fuel injection. Thereby, it is possible to realize the clog prevention control of the exhaust fuel addition valve 88 as soon as possible.

Meanwhile, in the second embodiment, when it is necessary to add the fuel to the exhaust post-treatment device 55 and when the exhaust temperature is lower than the minimum operating exhaust temperature (S210, No), the exhaust temperature increasing control may be performed by performing the after-injection by the fuel injection device 80 an the procedure may return to the step S200 without shifting to the step S216. Thereby, it is possible to increase the exhaust temperature of the exhaust gas flowing through the exhaust post-treatment device 55 to not lower than the minimum operating exhaust temperature set according to the biofuel concentration. Thereby, it is possible to realize the fuel addition control to the exhaust fuel addition valve 88 as soon as possible.

Meanwhile, although the diesel engine 10 is provided with the NOx occlusion-reduction catalyst 55a and the DPNR catalyst system 55c as the exhaust post-treatment device 55 in the above-described embodiments, the exhaust post-treatment device of the diesel engine to which the present invention is applicable is not limited to this. The present invention is applicable to any diesel engine provided with one of the exhaust purification catalyst requiring the supply of the reduction agent and the filter mechanism of which temperature is required to be increased as the exhaust post-treatment device, and for example, the present invention may be applied to the diesel engine provided with one of the NOx occlusion-reduction catalyst and the DPNR catalyst system and the diesel engine provided with only the diesel particular filter (DPF).

Meanwhile, although the diesel engine is provided with the EGR device and the turbo supercharger in the above-described embodiments, the configuration of the diesel engine to which the present invention may be applied is not limited to this aspect. The present invention can be applied to any diesel engine provided with the exhaust fuel addition valve capable of adding the fuel from the exhaust passage on the upstream side of the exhaust post-treatment device.

INDUSTRIAL APPLICABILITY

As described above, the control unit of the diesel engine according to the present invention is suitable for the diesel engine provided with the exhaust fuel addition valve capable of adding the fuel from the exhaust passage on the upstream side of the exhaust post-treatment device.

The invention claimed is:

1. A control unit of a diesel engine that is used in the diesel engine provided with an exhaust fuel addition valve capable of adding fuel from an exhaust passage on an upstream side of an exhaust post-treatment device and is capable of controlling the exhaust fuel addition valve, the control unit comprising:
 a biofuel concentration estimating unit that estimates biofuel concentration in the fuel;
 an exhaust temperature obtaining unit that obtains an exhaust temperature in the exhaust passage; and
 a minimum operating exhaust temperature setting unit that sets a minimum operating exhaust temperature being a lower limit value of the exhaust temperature to permit fuel addition from the exhaust fuel addition valve, wherein
 the minimum operating exhaust temperature setting unit sets the minimum operating exhaust temperature according to the estimated biofuel concentration.

2. The control unit of the diesel engine according to claim 1, wherein
 the minimum operating exhaust temperature setting unit sets the minimum operating exhaust temperature so as to be higher than in a case in which the biofuel concentration is zero, when the estimated biofuel concentration is not lower than a predetermined value.

3. The control unit of the diesel engine according to claim 2, wherein
 the minimum operating exhaust temperature setting unit sets the minimum operating exhaust temperature so as to be higher as the biofuel concentration becomes higher, when the estimated biofuel concentration is not lower than a predetermined value.

4. The control unit of the diesel engine according to claim 3, wherein
 the diesel engine is provided with a fuel injection device capable of injecting the fuel into a cylinder at a fuel pressure higher than the fuel pressure of the exhaust fuel addition valve, and
 the control unit comprises an exhaust temperature increasing controlling unit that increases the exhaust temperature by allowing the fuel injection device to perform fuel injection at a timing delayed with respect to main injection, when the obtained exhaust temperature is lower than the minimum operating exhaust temperature set according to the biofuel concentration.

5. The control unit of the diesel engine according to claim 3, comprising:
 a clog prevention necessity judging unit that judges whether it is necessary to prevent clog of an injection hole of the exhaust fuel addition valve; and
 a clog prevention controlling unit that prevents the clog of the injection hole by allowing the exhaust fuel addition valve to inject the fuel, when it is judged that prevention of the clog is necessary and an obtained exhaust temperature is not lower than the minimum operating exhaust temperature set according to the biofuel concentration.

6. The control unit of the diesel engine according to claim 5, wherein
 an exhaust temperature controlling unit increases the exhaust temperature, when it is judged that the prevention of the clog is necessary and the obtained exhaust temperature is lower than the minimum operating exhaust temperature set according to the biofuel concentration.

7. The control unit of the diesel engine according to claim 2, wherein
 the diesel engine is provided with a fuel injection device capable of injecting the fuel into a cylinder at a fuel pressure higher than the fuel pressure of the exhaust fuel addition valve, and
 the control unit comprises an exhaust temperature increasing controlling unit that increases the exhaust temperature by allowing the fuel injection device to perform fuel injection at a timing delayed with respect to main injection, when the obtained exhaust temperature is lower than the minimum operating exhaust temperature set according to the biofuel concentration.

8. The control unit of the diesel engine according to claim 2, comprising:
 a clog prevention necessity judging unit that judges whether it is necessary to prevent clog of an injection hole of the exhaust fuel addition valve; and
 a clog prevention controlling unit that prevents the clog of the injection hole by allowing the exhaust fuel addition valve to inject the fuel, when it is judged that prevention of the clog is necessary and an obtained exhaust temperature is not lower than the minimum operating exhaust temperature set according to the biofuel concentration.

9. The control unit of the diesel engine according to claim 8, wherein
 an exhaust temperature controlling unit increases the exhaust temperature, when it is judged that the prevention of the clog is necessary and the obtained exhaust temperature is lower than the minimum operating exhaust temperature set according to the biofuel concentration.

10. The control unit of the diesel engine according to claim 1, wherein
 the diesel engine is provided with a fuel injection device capable of injecting the fuel into a cylinder at a fuel pressure higher than the fuel pressure of the exhaust fuel addition valve, and
 the control unit comprises an exhaust temperature increasing controlling unit that increases the exhaust temperature by allowing the fuel injection device to perform fuel injection at a timing delayed with respect to main injection, when the obtained exhaust temperature is lower than the minimum operating exhaust temperature set according to the biofuel concentration.

11. The control unit of the diesel engine according to claim 1, comprising:
 a clog prevention necessity judging unit that judges whether it is necessary to prevent clog of an injection hole of the exhaust fuel addition valve; and
 a clog prevention controlling unit that prevents the clog of the injection hole by allowing the exhaust fuel addition valve to inject the fuel, when it is judged that prevention of the clog is necessary and an obtained exhaust temperature is not lower than the minimum operating exhaust temperature set according to the biofuel concentration.

12. The control unit of the diesel engine according to claim 11, wherein
an exhaust temperature controlling unit increases the exhaust temperature, when it is judged that the prevention of the clog is necessary and the obtained exhaust temperature is lower than the minimum operating exhaust temperature set according to the biofuel concentration.

* * * * *